July 8, 1952   G. L. MORGAN   2,602,257
HERRING RIG
Filed Dec. 22, 1947
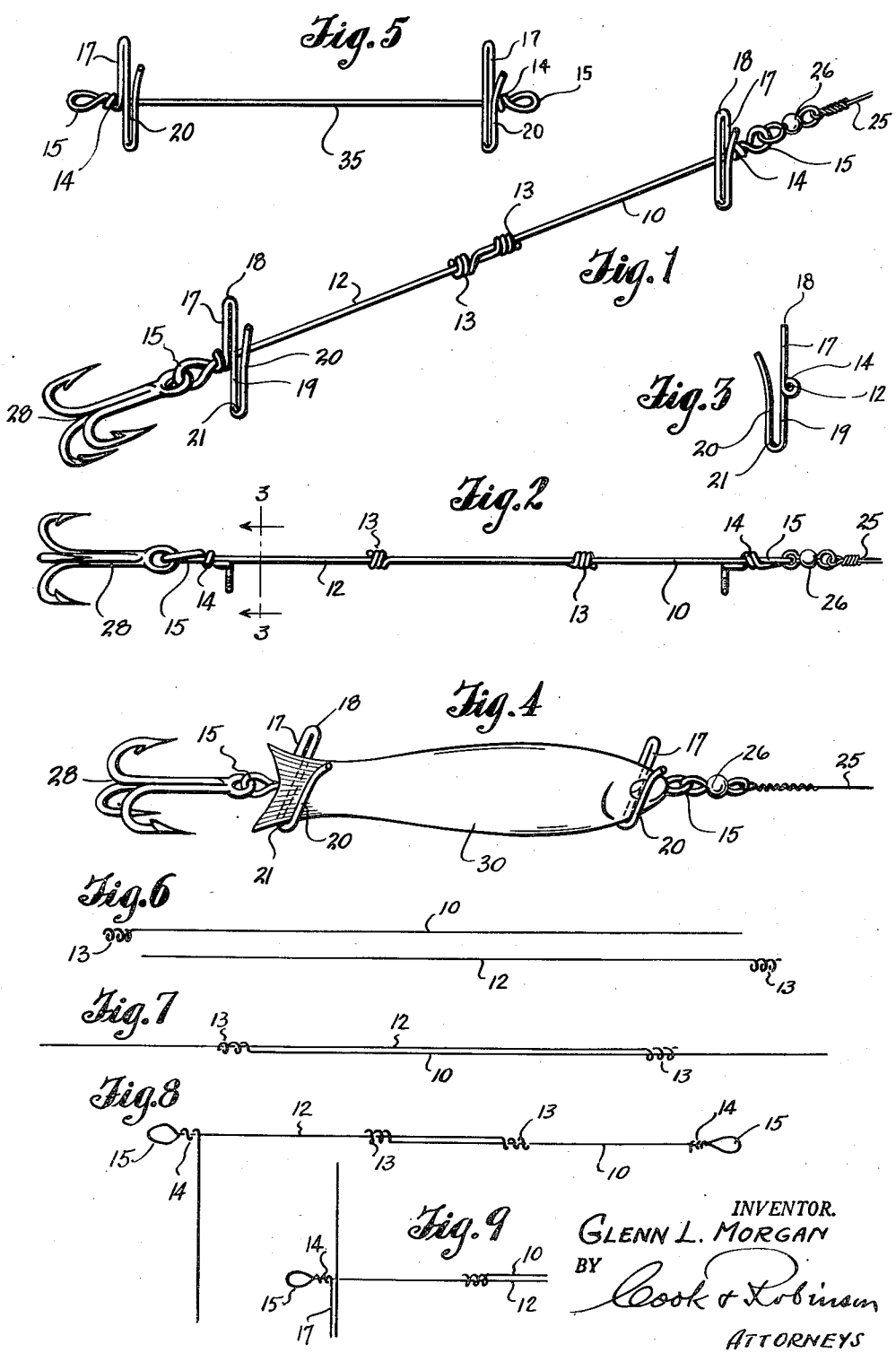
INVENTOR.
GLENN L. MORGAN
BY
Cook & Robinson
ATTORNEYS Patented July 8, 1952

2,602,257

UNITED STATES PATENT OFFICE 2,602,257

HERRING RIG

Glenn L. Morgan, Bremerton, Wash.

Application December 22, 1947, Serial No. 793,081

2 Claims. (Cl. 43—44.2)

This invention relates to fish lures and it has reference more particularly to means designed for attachment to a fish line and equipped for holding a small fish as a lure for catching fish in a trolling or similar fishing operation.

It is the principal object of this invention to provide a novel and effective rig for holding a small fish, at the end of the fish line, adjacent the hooks as a lure, and to equip the rig with means for the quick and easy application of the fish thereto.

Specifically stated, the object of my invention is to provide a device which I call a "herring rig," that may be attached at one end to the end of a fish line, and fish hooks attached thereto at its other end; and whereon clamping means are provided for receiving therein the tail and head portions of the fish, which is used as bait, to hold it in a manner that will cause it, when drawn through the water, to simulate the action of a swimming fish, or of a crippled fish, so as to attract or lure the fish that it is desired to catch.

It is a further object of the invention to provide a herring rig of the above stated character that may be adjusted in length to adapt it to the holding of fish of various lengths.

Still further objects of the invention reside in the details of construction of parts of the rig, in their assembled relationship and in the mode of use of the device as will hereinafter be fully described.

In accomplishing the above mentioned and other objects of the invention, I have provided the improved details of construction, the preferred forms of which are illustrated in the accompanying drawings, wherein:

Fig. 1 is a perspective view of the present "herring rig" as applied to a fish line, and with hooks attached thereto.

Fig. 2 is a top edge view of the parts shown in Fig. 1.

Fig. 3 is an enlarged cross-section, taken on line 3—3 in Fig. 2, showing one of the bait holding clamp members.

Fig. 4 is a view illustrating the manner of applying a small fish, to be used as bait, to the clamp members of the rig.

Fig. 5 is a perspective view of a herring rig of a modified form.

Figs. 6, 7, 8 and 9 are views illustrating successive steps in the making of the present device.

Referring more in detail to the drawings, and particularly to Figs. 1, 2 and 3:

The present device, which I call a herring rig, is made from two straight pieces of wire of suitable gauge and stiffness; each piece being approximately of the same length as the other. The two pieces of wire, as shown best in Fig. 6, are designated respectively by reference numerals 10 and 12 and for ordinary trolling operations which use herring as bait, these wires would be about six inches long.

In the making of the device, each piece of wire is formed at one end as in Fig. 6 into a short, open helical coil 13, and then the two wires are assembled, as shown in Fig. 7, by projecting the straight portion of each wire through the coil 13 of the other, thus to provide a sliding connection that permits the overall length of the assembled pieces to be extended or decreased, for a purpose presently explained, but limited in extent by the engaging of the coiled portions.

After so assembling the two wires, the outer end portion of each is bent back and helically wound tightly about the body portion, as at 14, to provide a loop or eyelet 15 at the outer end of the piece. From the inner end of each helical portion 14, the end portion of the wire is bent directly upward to form a vertical leg 17. From the upper end of the leg 17, the wire is then bent directly downward, as at 18, to extend along the leg 17 and to a distance below the straight part of the wire substantially equal to the height of leg 17. This downwardly directed portion, which is designated by reference numeral 19, comprises the inner jaw member of a clamp. From the lower end of the length of wire designated by 19, the wire is bent upwardly, as shown best in Fig. 3, providing the outer jaw portion 20 of the clamp. Preferably the piece 20 terminates short of the upper end of the leg 17 and is slightly outwardly inclined so as to provide a somewhat flared entrance, or mouth, to the seat 21 provided between and at the lower ends of the clamp members 19 and 20.

The wire used in the making of this device should be relatively stiff so as to hold the form to which it is bent. However, the clamp members 19—20 may be bent more or less together to increase or decrease the holding action and to provide for receiving fish of different size between them.

To use the device, it is attached to a line or leader 25 as shown in Fig. 1, preferably by attaching a swivel, as at 26, to the loop 15, and then attaching the line to the swivel. Fish hooks, such as shown at 28, are attached to the rear end loop of the rig. To bait the rig, a fish, such as a small herring, indicated by numeral 30 in Fig. 4, is placed along the rig and its tail and head portions applied within the clamp portions at forward and rearward ends of the rig, and these are pressed toward closed position to secure the fish. If it is required, the two wires may be adjusted lengthwise of each other to give the device the proper length to best suit the fish which is used as bait. Also, if it is desired to add action to the movement of the bait when drawn through the water, the wires between the clamps may be bent so as to curve the body of the fish accordingly.

Devices of this kind have proven to be very desirable and satisfactory in use due to their adjustability and the ease with which the bait may be applied or removed.

The modification of the lure which has been illustrated in Fig. 5 is made from a single length of wire 35 which is bent at its opposite ends to provide the loops 15 and the two clamp members. In the drawing, these parts have been given reference numerals corresponding to those for similar parts on the device of Fig. 1. The same advantages are obtained in this form, with the exception of the adjustability of length.

Having thus described my invention, what I claim as new therein and desire to secure by Letters Patent is:

1. A herring rig comprising two substantially straight lengths of wire, each with its inner end portion overlapped with and wound about the other, and in a manner providing sliding adjustment, the outer end portion of each wire formed into a loop and wound, near the loop, about the main portion of the wire, then having reverse bends extending laterally perpendicular to the direction of the joined wires to provide opposedly related clamp members that extend above and below the axis of the wires; said loops being adapted, respectively, for attachment of the rig to a fish line and for attachment of fish hooks to the rig, and said clamp members being adapted to holdingly receive the head and tail ends of a small fish and to hold the fish to extend above and below the wires between the clamps.

2. A herring rig comprising two substantially straight lengths of wire slidably joined and equipped at their outer ends, respectively, for the attachment of a fish hook thereto and for the swiveled connection of the wire to a fish line, and a clamping member secured on each wire near its outer end and adapted for receiving and holding the head and tail portions of a small fish therein; said clamping members extending substantially an equal distance above and below the wire and at right angles thereto.

GLENN L. MORGAN.

REFERENCES CITED

The following references are of record in the file of this patent:

UNITED STATES PATENTS

| Number | Name | Date |
|---|---|---|
| 777,751 | Sayle | Dec. 20, 1904 |
| 801,649 | Coffin | Oct. 10, 1905 |
| 973,246 | Aagaard | Oct. 18, 1910 |
| 1,025,695 | Gibson | May 7, 1912 |
| 2,080,347 | Thompson | May 11, 1937 |
| 2,407,759 | McDougal | Sept. 17, 1946 |
| 2,533,390 | Miller | Dec. 12, 1950 |